Sept. 20, 1932.   A. L. HOLVEN   1,878,144
PROCESS OF RECOVERING SUCROSE FROM CANE MOLASSES
Filed Feb. 6, 1928
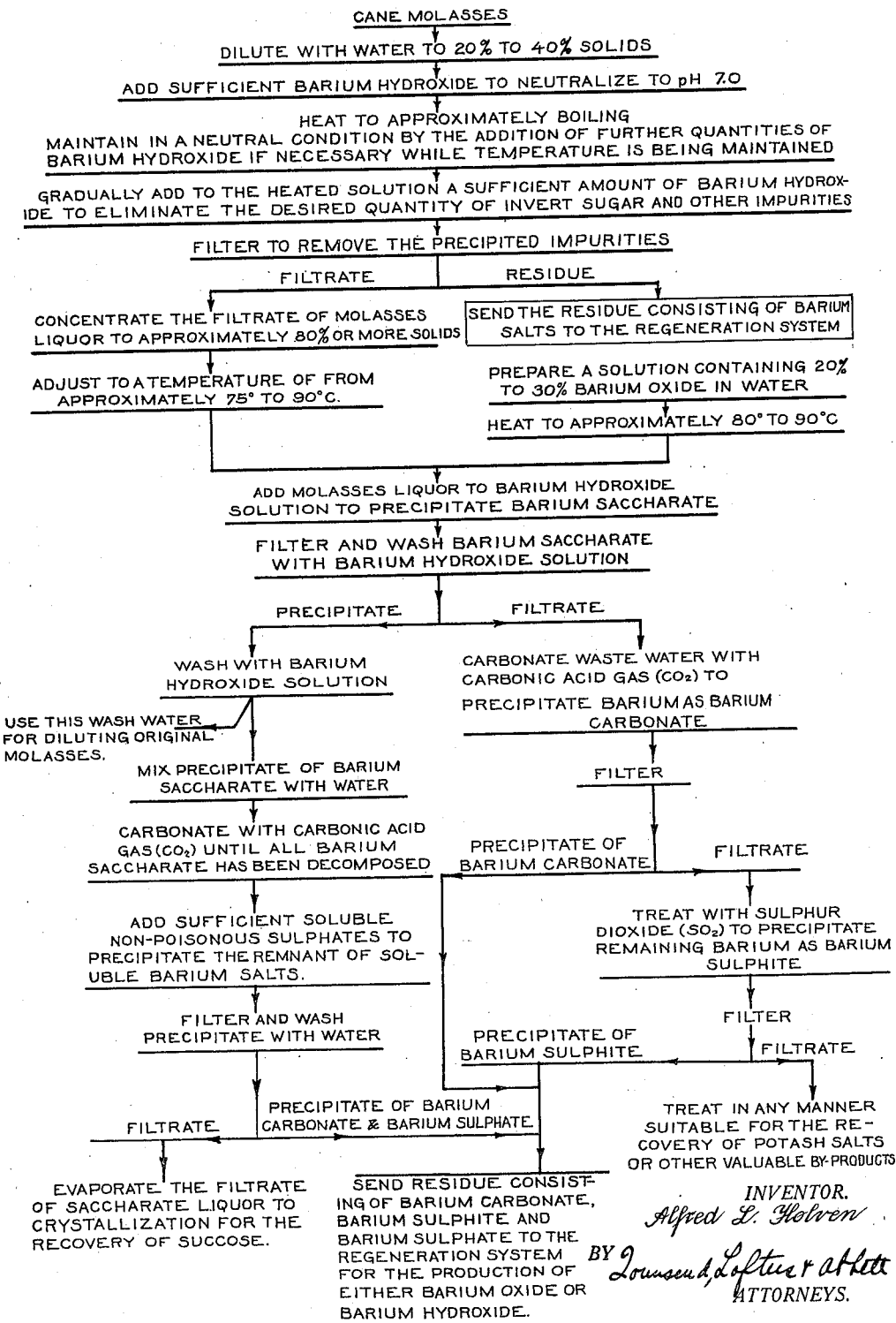
INVENTOR.
Alfred L. Holven
BY Townsend, Loftus & Ablett
ATTORNEYS.

Patented Sept. 20, 1932

1,878,144

UNITED STATES PATENT OFFICE

ALFRED L. HOLVEN, OF CROCKETT, CALIFORNIA

PROCESS OF RECOVERING SUCROSE FROM CANE MOLASSES

Application filed February 6, 1928. Serial No. 252,078.

This invention relates particularly to the recovery of sucrose from cane molasses by means of a process involving the use of barium in the form of either barium oxide or barium hydroxide.

The recovery of sucrose from beet molasses may be readily accomplished by processes wherein the sucrose is precipitated as either calcium saccharate or barium saccharate, but when these same processes have been applied to cane molasses the recovery of sucrose has not been sufficiently great to justify the operations. The difference in the results obtained when applying similar desugarization processes to both beet and cane molasses may be directly attributed to the fact that cane molasses contains a relatively large proportion of invert sugars, while these products are practically absent from beet molasses. The difficulties encountered during the attempted application of such processes to cane molasses have been due principally to the fact that the invert sugar decomposes to form impurities which have made it impossible to satisfactorily recover the sucrose therefrom. The principal objects of the present invention are, therefore, to provide a method of satisfactorily eliminating the invert sugar from cane molasses and to subsequently recover the bulk of the sucrose present in said molasses.

It has been proposed by Deguide in his German Patent No. 395,563 to add caustic baryta to the molasses when cold and subsequently heat the mass to the boiling point to eliminate reducing sugars. He then adds an additional amount of caustic baryta to the molasses and again heats it to the boiling point to precipitate the barium saccharate therein. The present invention distinguishes over this disclosure in several very important respects, as a result of which, a greater quantity and a superior quality of sucrose is recovered. Among the more important distinguishing differences are the following:

1. When the caustic baryta is added to the cold solution and during the subsequent heating, as disclosed by Deguide, barium saccharate will be precipitated with the reducing sugars and therefore lost, whereas, when the barium oxide or hydroxide is added to the heated solution rather than to the solution before heating, the baryta alkalinity will be concentrated on the elimination of reducing sugars rather than on the precipitation of barium saccharate, and therefore a loss of the latter, as suggested above will be prevented.

2. Deguide suggests the addition of the entire amount of barium hydroxide in one step, whereas in the present case the barium oxide or hydroxide is not added to the heated molasses all at one time. This difference is material as it has been found to be very important that the barium oxide or hydroxide be gradually supplied to the heated and neutralized molasses in adequate quantities to maintain a sufficiently alkaline condition to rapidly eliminate reducing sugars, the additions so made being so regulated that the alkalinity of the solution will be maintained below a point at which barium saccharate will be formed.

3. In the present case the molasses, after the removal of reducing sugars, is added to the barium hydroxide solution where the barium saccharate is precipitated in the presence of a desirable excess of reagent and a high alkalinity with relatively small amounts of impurities. This practice produces a large grained saccharate of high purity, whereas it has been found by experiment that when barium hydroxide is added to the molasses, as disclosed by Deguide, a smaller grained saccharate contaminated by undesirable impurities results.

The present invention contemplates the use of alkaline conditions produced by the addition of either barium oxide or barium hydroxide to the diluted and heated molasses in order to eliminate invert sugars, thereafter again using barium in the form of either barium oxide or barium hydroxide to precipitate the sucrose in the form of insoluble barium saccharate. It has been found that by properly and carefully controlling the temperature and the addition of barium, as hereinafter specified, in the form of either barium oxide or barium hydroxide, during the steps of this process, it is possible to efficiently recover a greater quantity of the sucrose in a relatively pure form than has heretofore been possible.

This invention is illustrated by way of example in the accompanying diagram which shows a flow plan indicating the steps of the process.

It has been found in the analysis of cane molasses that the sucrose is usually associated with approximately an equal weight or less of invert sugars. In the recovery of the sucrose from such a molasses by this process it is necessary to eliminate a sufficient amount of the invert sugars to make it possible to recover the sucrose in a relatively pure form. This is accomplished in the present invention in the manner described below.

As a first step in this accomplishment, the molasses is diluted to such an extent that it contains from 20% to 40% of solids. The only feature which necessitates the above dilution of the product is the filtration of the treated liquor and it will therefore be quite probable that some types of molasses may be filtered with a higher percent of solids than is indicated above. The rate of reducing sugar elimination is practically independent of the percentage of solids in solution but it has been found that more economic operation can be maintained where it is practical to maintain a high percentage of solids in solution. Sufficient barium in the form of a solution of barium oxide or barium hydroxide is then added to neutralize the acids present in the original molasses to such an extent that the neutralized molasses has a hydrogen ion concentration of approximately pH 7.0. This condition should be maintained by the addition of such further quantities of barium hydroxide or barium oxide as may be necessary during the subsequent heating of the neutralized solution. The addition of barium oxide, barium hydroxide, or other alkaline reagent at this stage of the process is not necessarily an essential step in the operation of this process, but it results in the recovery of a greater proportion of the sucrose by preventing the loss of sucrose through inversion during the heating of the molasses which would otherwise become sufficiently acid to convert a part of the sucrose to invert sugars.

The neutralized solution is then heated to approximately the boiling point and thereafter barium in the form of a solution of either barium oxide or barium hydroxide is gradually added thereto for the purpose of eliminating invert sugars and other undesirable impurities. The temperature indicated above is approximate and may be exceeded slightly in this instance as the solution is so dilute that there will be no destruction of sucrose due to overheating. Variations from this temperature can be more safely made in the opposite direction and can go as low as 80° C. The invert content need only be reduced to a point where it will no longer be an interfering factor in subsequent operations. The time required in carrying out this operation has been found to be approximately twenty minutes. The amount of barium oxide or barium hydroxide may vary with different types of molasses, but a sufficient amount of the above reagent is to be added to render the process as described commercially or economically profitable. The amount of barium oxide (BaO) required for the elimination of invert sugars will be approximately equal to the weight of said invert sugars. On some types of molasses, however, it may be desirable to use somewhat more barium oxide in order to eliminate other impurities which would interfere with the subsequent recovery of the sucrose.

Attention is particularly directed to the fact that the barium, in the form of a solution of either barium oxide or barium hydroxide, used for the elimination of invert sugars, is not mixed with the molasses prior to its dilution or its boiling, but to the boiling solution thereby insuring that the barium added at this stage will be mixed with the molasses at the optimum temperature for reactions which will tend to eliminate invert sugars but not to produce barium saccharate.

Attention is also directed to the fact that in the present process, the barium, in the form of barium oxide or barium hydroxide, is gradually supplied to the neutral and heated molasses liquor either continuously or intermittently by the frequent addition of small portions in such a manner as to maintain the solution in a sufficiently alkaline condition to eliminate invert sugars, but below the alkalinity at which any appreciable quantity of barium saccharate will be formed. An excessive alkalinity, which would be produced by the addition of an excess of barium hydroxide or barium oxide, must be avoided, inasmuch as such an excessive alkalinity would result in a precipitation of barium saccharate, with a consequent decrease in the amount of sucrose which can be recovered.

After the elimination of the desired amount of invert sugars has been completed as a result of the combined influence of heat and alkaline conditions, the treated molasses liquor is then filtered, thus removing from the treated molasses liquor the insoluble decomposition products produced during the elimination of invert sugars. As the resulting filter cake of insoluble decomposition products contains barium salts, it is subjected to a process suitable for their regeneration to barium hydroxide or barium oxide. The filtered molasses liquor is then concentrated to a density at which the precipitation of sucrose as a barium saccharate may be most efficiently accomplished. Under most conditions, a concentration to approximately 80% solids is satisfactory for this purpose. Where the viscosity of the molasses is such that it can be readily agitated, a higher density is preferable, as the recovery of sucrose therefrom varies in proportion with the percent of solids in the solution. Under some conditions, however, it may be desirable to concentrate the treated liquor prior to the removal of the insoluble decomposition products by filtration, rather than after filtration, since an additional amount of impurities which may have been rendered insoluble during the concentration are thereby also eliminated. Such a change, however, is merely a change in the sequence of the operations of this process and is included as a part of the present invention.

The filtered and concentrated liquor is then ready for the second step of the process, which consists of a treatment with barium in the form of a solution of barium hydroxide, in order to precipitate the sucrose as a barium saccharate. It has been found that the weight of barium (as dry barium oxide, which, in solution, is barium hydroxide) required for a practically complete precipitation of the sucrose from the molasses liquor will be equal to from 60% to 70% (expressed as barium oxide, BaO) on the total weight of sucrose present in the molasses liquor. The filtered and concentrated molasses liquor is adjusted to a temperature of approximately 75° C. and is then added to the required amount of a solution containing approximately 20% to 30% of pulverized or finely divided barium oxide or an equivalent amount of barium hydroxide, the latter solution having been heated to approximately 80° C. to 90° C. previous to the addition of the hot concentrated molasses liquor thereto. Attention is directed to the fact that the hot concentrated molasses liquor is added to the barium hydroxide solution, rather than the reverse. This method of procedure insures that at this stage of the process the mixture of molasses, liquor and barium hydroxide solution will be maintained at the exceedingly high alkalinities which represent the optimum condition of alkalinity for the combination of barium oxide and sucrose to form barium saccharate.

It has been found in this connection that if a small quantity of barium saccharate from a previous cycle of operations is added either to the concentrated molasses liquor or to the barium hydroxide solution prior to their mixing, the particles of added barium saccharate appear to act as nuclei of crystallization for further quantities of barium saccharate, thereby aiding in the formation of a granular precipitate of barium saccharate which can be very readily filtered and washed in the subsequent operations of this process. It is also desirable to employ a vigorous agitation within the solution during the time that the barium saccharate is being formed. This agitation causes a rapid and intimate mixing of the barium hydroxide and the molasses liquor and results in an economy of reagent, a more complete recovery of the sucrose, and the production of a granular precipitate which can be readily filtered. After the precipitation of the sucrose in the form of barium saccharate has been completed, the solution is again filtered to separate the precipitated barium saccharate from the almost completely desugarized liquor. After the filtration, the precipitate of barium saccharate is washed with a solution of barium hydroxide for the purpose of displacing and washing away the soluble impurities in the barium saccharate precipitate. The addition of either barium oxide or barium hydroxide to the wash water is necessary in order to prevent the solution of any of the barium saccharate during washing operations. The wash water containing barium hydroxide may then be added to the waste water, or it can be used instead of pure water for diluting the original molasses prior to the elimination of the reducing sugars. This procedure is recommended as the wash water contains more or less sucrose which will then be readily recovered in the next saccharate operation. The combined wash and waste waters, or the waste water as the case may be, is then subjected to the action of carbonic acid gas until soluble barium salts have been precipitated in the form of insoluble barium carbonate. The precipitate of barium carbonate may be removed by filtration and subjected to a process suitable for regeneration to either barium hydroxide or barium oxide. When the reducing sugars are decomposed by barium hydroxide, barium lactate and similar compounds are formed. These are soluble compounds which cause considerable barium to be present in the waste water, and therefore, for economic operation this barium should be precipitated and recovered. These compounds are so stable that barium cannot be completely precipitated therefrom by carbon dioxide, but it has been found possible and desirable to precipitate the barium as barium sulphite by the use of sulphur dioxide gas. The filtrate from the carbonated wash and waste waters may be treated in many manners suitable for the recovery of the potassium carbonate or other valuable by-products present therein.

The precipitated barium saccharate is resuspended in water and dispersed by agitation. Carbonic acid gas is then passed through the solution until all of the barium saccharate has been decomposed with the liberation of sucrose and the formation of insoluble barium carbonate. The carbonated saccharate liquor is then treated with a sufficient quantity of sulphates to precipitate any soluble barium salts which have not been precipitated in the form of barium carbonate. While any soluble non-poisonous sulphate may be used in the accomplishment of this result, it may often be desirable to precipitate the remaining soluble barium salts by the addition of such sugar solutions as contain appreciable quantities of sulphate salts and have a purity approximately the same as that of the saccharate liquor. While I have recommended the use of any soluble non-poisonous sulphate for the precipitation of barium from the saccharate liquor, it has been found particularly advantageous to use aluminum sulphate for this purpose, the typical reaction of which is as follows:

$$3\ Ba(HCO_3)_2 + Al_2(SO_4)_3 \rightarrow 3\ BaSO_4 + 2Al(OH)_3 + 6CO_2$$

Some of the advantages in using aluminum sulphate are that the barium is precipitated as insoluble barium sulphate and the aluminum ion is simultaneously precipitated as aluminum hydroxide (thus effecting purification without increase in melassigenic salts), and the aluminum hydroxide so formed has a very desirable defecating action on the solution. The carbonated saccharate liquor is then filtered in order to remove from said liquor the precipitated barium carbonate and barium sulphate. The residue of barium carbonate and barium sulphate is then returned to a regenerating system from which either barium oxide or barium hydroxide may be recovered. Under conditions where the introduction of barium sulphate into a system which regenerates either barium oxide or barium hydroxide is undesirable, the addition of sulphates as described above may be made in an independent step after the filtration of the carbonated liquor has been completed.

The filtered and carbonated saccharate liquor is now a solution containing so few impurities that sucrose may be readily obtained therefrom by the usual processes of crystallization.

It will thus be seen that by the means here shown, a substantially continuous recovery of sucrose may be obtained from cane molasses, and that practically all of the sucrose present in said molasses may be obtained therfrom in a relatively pure form.

While I have described a preferred method of carrying out my invention, it is to be understood that various changes may be made between the limits herein set forth and in the sequence of operations without departing from the spirit of the invention as defined in the appended claims.

Having thus described my invention, what I claim and desire to secure by Letters Patent is—

1. A process of cane molasses treatment for the recovery of the sucrose contained therein, which consists in forming a diluted solution of cane molasses, then heating said solution to a temperature between 80° and 110° C. during which time an alkaline earth metal hydroxide is added to the solution in sufficient quantities to maintain the solution in a neutral condition, and thereafter adding further quantities of the alkaline earth metal hydroxide during the continued heating of the solution so as to eliminate invert sugar and other impurities from the solution but insufficient to precipitate the sucrose and then separating the precipitated impurities from the solution.

2. A method of recovering sucrose from cane molasses, which consists in diluting the molasses with water, thereafter raising the temperature of the solution to a temperature between 80° and 110° C., during which time barium hydroxide is added in quantities sufficient to establish a neutral condition and to maintain the same, then gradually adding to the heated solution barium hydroxide in an additional amount sufficient to cause the invert sugar and other impurities to be eliminated from the solution but insufficient to precipitate the sucrose, thereafter separating the solution from the precipitate by filtration, then concentrating said filtrate to approximately 80% solids, then adding said concentrated filtrate to a barium hydroxide solution so as to precipitate the sucrose in the form of barium saccharate, and then filtering the barium saccharate from the solution.

3. A method of recovering sucrose from cane molasses, which consists in diluting the molasses with water, thereafter raising the temperature of the solution to a temperature between 80° and 110° C., during which time barium hydroxide is added in quantities sufficient to establish a neutral condition of the solution and to maintain the same, then gradually adding to the heated solution barium hydroxide in an additional amount sufficient to cause the invert sugar and other impurities to be eliminated from the solution but insufficient to precipitate the sucrose, thereafter separating the solution from the precipitated impurities by filtration, then concentrating said filtrate, then adding said concentrated filtrate to a solution of barium hydroxide whereby barium saccharate will be formed, then filtering the barium saccharate from the solution, then treating the barium saccharate in such a manner as to liberate the sucrose therefrom and to precipitate the barium, and then filtering the solution.

4. A process of treating molasses substantially free from invert sugar to recover the sucrose therefrom, one step of which consists in adding to the sugar liquor derived by carbonation of the barium saccharate, aluminum sulphate in order to precipitate barium salts present as impurities in said sugar liquor.

5. A process of cane molasses treatment for the recovery of the sucrose contained therein, which consists in forming a solution of cane molasses, then heating said solution to a temperature between 80° and 110° C. during which time an alkaline earth metal hydroxide is added to the solution in sufficient quantities to maintain the solution in a neutral condition, and thereafter but prior to the precipitation of sucrose adding further quantities of the alkaline earth metal hydroxide during the continued heating of the solution in sufficient quantities to eliminate only the invert sugar and other impurities from the solution, then separating the precipitated impurities from the solution by filtration, and finally precipitating the sucrose as a saccharate by the addition of an earth metal hydroxide.

6. A method of recovering sucrose from cane molasses, which consists in diluting the molasses with water, thereafter raising the temperature of the solution to a temperature between 80° and 110° C. during which time barium hydroxide is added in quantities sufficient to establish a neutral conditon and to maintain the same, then gradually adding to the heated solution barium hydroxide in an additional amount sufficient to cause the invert sugar and other impurities to be eliminated from the solution but insufficient to precipitate the sucrose, thereafter separating the solution from the precipitate by filtration, then adding said filtrate to a barium hydroxide solution so as to precipitate the sucrose in the form of barium saccharate, and then filtering the barium saccharate from the solution.

ALFRED L. HOLVEN.